United States Patent

Morgenstern et al.

[11] Patent Number: 5,839,660
[45] Date of Patent: Nov. 24, 1998

[54] AUXILIARY SPRINKLER SYSTEM CONTROLLER TO MAINTAIN HEALTHY TURF WITH MINIMUM WATER USAGE

[76] Inventors: Paul Morgenstern; John F. McJunkin, both of 3703 Alexander Dr., Austin, Tex. 78749

[21] Appl. No.: 872,964

[22] Filed: Jun. 11, 1997

[51] Int. Cl.⁶ .......................... A01G 25/00; A01G 27/00
[52] U.S. Cl. .............................. 239/63; 239/64; 239/67; 239/69; 239/DIG. 15
[58] Field of Search ................. 239/63, 64, 67, 239/68, 69, DIG. 15

[56] References Cited

U.S. PATENT DOCUMENTS

| | | |
|---|---|---|
| 4,488,568 | 12/1984 | Hasenbeck . |
| 4,919,165 | 4/1990 | Lloyd . |
| 5,023,787 | 6/1991 | Evelyn-Veere ..................... 239/69 X |
| 5,097,861 | 3/1992 | Hopkins et al. .................... 239/69 X |
| 5,148,826 | 9/1992 | Bakhshaei . |
| 5,208,855 | 5/1993 | Marian ............................... 239/69 X |
| 5,229,937 | 7/1993 | Evelyn-Veere ..................... 239/69 X |
| 5,337,777 | 8/1994 | Shaw et al. . |
| 5,355,122 | 10/1994 | Erickson . |
| 5,375,617 | 12/1994 | Young . |
| 5,400,815 | 3/1995 | Whitehill . |
| 5,444,611 | 8/1995 | Woytowitz et al. ................ 239/69 X |
| 5,479,339 | 12/1995 | Miller ................................. 364/145 |
| 5,496,112 | 3/1996 | Browne .............................. 374/54 |
| 5,539,637 | 7/1996 | Upchurch et al. ................. 364/420 |
| 5,694,963 | 12/1997 | Fredell et al. ..................... 137/2 |
| 5,696,671 | 12/1997 | Oliver ................................ 239/69 X |

*Primary Examiner*—Andres Kashinkow
*Assistant Examiner*—Robin O. Evans
*Attorney, Agent, or Firm*—Joseph F. Long

[57] ABSTRACT

An auxiliary sprinkler system control unit that interrupts a sprinkler system when ambient temperature is below thirty six degrees and when wind velocity is above ten miles per hour and when one half inch of water has been measured and delays the sprinkler for one day when in each month a daily running total of water addition is greater than a daily running total of an expected evapotranspiration or soil evaporation and plant transpiration rate as published for a specific area; said unit thereby providing a minimum amount of water to keep a healthy but slow growing turf.

6 Claims, 2 Drawing Sheets

AUXILIARY SPRINKLER SYSTEM CONTROLLER TO MAINTAIN HEALTHY TURF WITH MINIMUM WATER USAGE

BACKGROUND OF THE INVENTION

Most landscape irrigation or sprinkler system controllers are simply time based. Some use rain sensors and some use moisture sensors for control. Properly designed sprinkler systems water each of multiple zones in sequence with each zone receiving close to the same amount of water. The home owner adjusts the time and therefore the amount of water put out by the sprinkler. Quite generally the sprinklers operate on a periodic basis and quite generally the sprinklers are set to water until there is a water run off. If the home owner adjusts the time so that there is either none or very slight run off the sprinkler will be putting out about one fourth of an inch of water per cycle. There is data to show that about one fourth of an inch of water is all that is absorbed with a heavy rain or with excessive sprinkling or irrigation. In many sprinkler systems the effect of rainfall is not taken into account and the home owner may need to manually operate the system to prevent sprinkling during a rain.

of one fourth of an inch exceeds the cumulative daily calculated amount necessary to meet the expected evaporation and transpiration the sprinkler is automatically shut off for that day. For minimum water usage to maintain a healthy turf, a combination of data taking into account soil type, type of turf, rain fall, irrigation, humidity, plant transpiration rate, and wind speed could give near perfect control. Texas A & M University, The Center for Irrigation Technology, The University of Illinois at Urbana and others have spent, years measuring annual rainfall, soil absorption rates, average humidity, cloud cover, average wind speed and plant transpiration rates. Inputting this data into generally accepted mathematical models has produced a number called EVT, or Evapotranspiration rate values for geographical areas with populations as small as 50,000. The following chart shows these numbers for many cities in Texas but does not take into account soil type and type of turf. However the soil type and turf type would normally vary this data about ten percent. In our system there is an adjustment knob to allow the home owner to adjust the EVT data by turf appearance to more than cover this variation.

Reference Evapotranspiration ($ET_0$) In Inches[1]

| City | Jan | Feb | Mar | Apr | May | June | July | Aug | Sep | Oct | Nov | Dec | Total |
|---|---|---|---|---|---|---|---|---|---|---|---|---|---|
| Abilene | 1.20 | 1.60 | 3.90 | 4.70 | 7.90 | 8.61 | 8.75 | 8.15 | 7.10 | 4.90 | 2.80 | 1.00 | 60.61 |
| Amarillo | 1.20 | 1.50 | 3.80 | 5.00 | 8.88 | 9.72 | 9.61 | 8.95 | 6.86 | 4.70 | 2.60 | 1.20 | 63.96 |
| Austin | 2.00 | 2.66 | 4.30 | 5.27 | 7.55 | 8.28 | 8.12 | 8.20 | 6.22 | 4.93 | 3.08 | 2.08 | 62.69 |
| Brownsville | 2.57 | 3.18 | 4.53 | 5.31 | 6.88 | 7.31 | 7.59 | 7.33 | 5.98 | 5.16 | 3.40 | 2.42 | 61.66 |
| College Station | 2.00 | 2.65 | 4.23 | 5.22 | 7.57 | 8.35 | 8.20 | 8.41 | 6.25 | 4.91 | 2.83 | 2.04 | 62.66 |
| Corpus Christi | 2.42 | 3.06 | 4.56 | 5.31 | 6.97 | 7.53 | 7.89 | 7.45 | 5.95 | 5.12 | 3.28 | 2.30 | 61.84 |
| Dallas/Ft. Worth | 1.80 | 2.45 | 4.09 | 5.15 | 7.41 | 8.42 | 8.76 | 8.13 | 6.13 | 4.49 | 2,62 | 1.72 | 61.17 |
| Del Rio | 1.30 | 1.80 | 4.30 | 5.20 | 8.01 | 8.71 | 8.26 | 8.24 | 7.70 | 6.00 | 3.00 | 1.10 | 63.62 |
| El Paso | 1.30 | 1.70 | 4.20 | 5.60 | 8.88 | 9.91 | 9.24 | 8.32 | 7.60 | 5.20 | 3.00 | 1.10 | 66.05 |
| Galveston | 1.65 | 2.10 | 3.14 | 4.04 | 4.84 | 5.18 | 4.97 | 5.10 | 5.05 | 3.99 | 2.51 | 1.71 | 44.28 |
| Houston | 2.02 | 2.71 | 4.03 | 5.23 | 7.48 | 8.08 | 7.79 | 7.78 | 6.06 | 4.90 | 3.06 | 2.12 | 61.26 |
| Lubbock | 1.20 | 2.10 | 4.60 | 5.40 | 8.37 | 9.23 | 9.06 | 8.26 | 6.60 | 5.00 | 2.30 | 1.00 | 63.12 |
| Midland | 1.30 | 1.70 | 4.20 | 5.60 | 8.60 | 9.23 | 9.10 | 8.35 | 7.60 | 5.20 | 3.00 | 1.10 | 64.98 |
| Port Arthur | 1.98 | 2.71 | 4.09 | 4.93 | 7.09 | 7.66 | 7.25 | 7.27 | 5.82 | 4.74 | 2.95 | 2.00 | 58.49 |
| San Angelo | 1.30 | 1.80 | 4.30 | 5.20 | 8.01 | 8.71 | 8.26 | 8.24 | 7.70 | 6.00 | 3.00 | 1.10 | 63.62 |
| San Antonio | 2.07 | 2.77 | 4.40 | 5.33 | 7.58 | 8.21 | 7.96 | 8.03 | 6.19 | 4.95 | 3.14 | 2.15 | 62.78 |
| Victoria | 2.13 | 2.78 | 4.34 | 5.18 | 7.13 | 7.65 | 7.94 | 7.59 | 6.09 | 5.02 | 3.19 | 2.23 | 61.27 |
| Waco | 1.92 | 2.57 | 4.27 | 5.26 | 7.55 | 8.38 | 8.74 | 8.27 | 6.30 | 4.94 | 2.74 | 1.79 | 62.73 |
| Wichita Falls | 1.10 | 1.50 | 3.70 | 4.50 | 7.89 | 8.86 | 9.20 | 8.50 | 6.70 | 5.20 | 2.10 | 0.90 | 60.15 |

For a home owner desiring to have a healthy turf with minimum water usage the usual system presents several problems that this invention is designed to prevent.

These are:

some difficulty in properly setting the sprinkler timer. Instructions with the system of this invention suggest that the time be set to sprinkle until one fourth of an inch of water accumulates in a straight sided vessel;

manually preventing the sprinkler from operating during a rain; the invention measures water added to the turf and interrupts the sprinkling immediately when one half an inch of water has been added;

adding more water than is needed for minimum healthy turf;

in the system of this invention the expected soil evaporation and plant transpiration rate for each month of the year, for zip code specific areas is preloaded in a microprocessor and when the cumulative amount of water added by sprinkler and by rainfall with either taken into account as a maximum The auxiliary controller of this invention starts with the extensive data base of EVT values and measures in real time; total water from rainfall, sprinkling or irrigation, wind speed, and air temperature. EVT data is specific down to the first three digits of a Zip code allowing the auxiliary controller to be settable to use minimum water for relatively specific areas on monthly basis. Thereis also a user adjustment knob to allow the user to adjust the preloaded EVT data so that the cumulative amount of water added varies from a minus 35% to a plus 35% of water called for in the unadjusted EVT data. This percentage variation is sufficient to take care of variations in soil type, turf type and the appearance of the turf.

The system of this invention comprises a water gauge, a wind sensor, a temperature measuring device, electronic circuitry and a microprocessor controller or central processor unit, CPU, and a switching means to interrupt a sprinkler system and is programmed to take into account:

when it rains soil type turf type total sprinkling water added per day

Evapotranspiration rate in different parts of the country current geographical location current temperature wind conditions day of the month and with user adjustability for turf appearance delivers very close to the minimum amount of water necessary to keep a healthy, slow growing turf. The exterior user adjustable variation of about 35% takes into account turf appearance and allows further adjustment for those users that desire greater than minimum growth.

There is a considerable body of prior art aimed at overriding sprinkler control to take into account rainfall, or to take into account soil moisture at a specific place or aimed at simulating and correcting for evaporation individually. We have found no prior art that with minor user adjustment provides for minimum water addition to keep a healthy but minimal turf growth using all the elements in a single integrated unit. There are many minor changes in the invention that are possible by those of normal skill in the art therefor we wish to be limited only to the spirit and purpose of the invention as outlined in these claims and specification.

SUMMARY OF THE INVENTION

The invention encompasses a sprinkler system control unit that delays or interrupts a sprinkler system set to add approximately one fourth of an inch of water per day when in each month a daily running total of water added is less than a daily running total of an expected evapotranspiration rate as published for a specific area by Texas A&M University and others; the unit is intended to provide a minimum amount of water to keep a healthy but slow growing turf. A water measuring system, a temperature measuring unit, and a wind velocity measuring system communicate with the central processor unit or CPU, or microprocessor control unit. When the wind velocity exceeds ten miles per hour watering is interrupted until the wind subsides; when the temperature falls below thirty six degrees Fahrenheit watering is interrupted until the temperature goes above thirty six degrees. This interruption is intended to prevent operation during freezing conditions. Internal controls in the unit allow manual adjustment signals to choose a particular Zip code area. There is an external user adjustment to allow the user to adjust the preloaded EVT data so that the cumulative amount of water added varies from a minus 35% to a plus 35% of water that would have been indicated as needed in the unadjusted EVT data. This is sufficient adjustment for a user to correct for soil and turf variations and to add water for a more vigorous growth when more than minimum turf growth is desired.

DETAILED DESCRIPTION OF THE INVENTION

Figure 1:
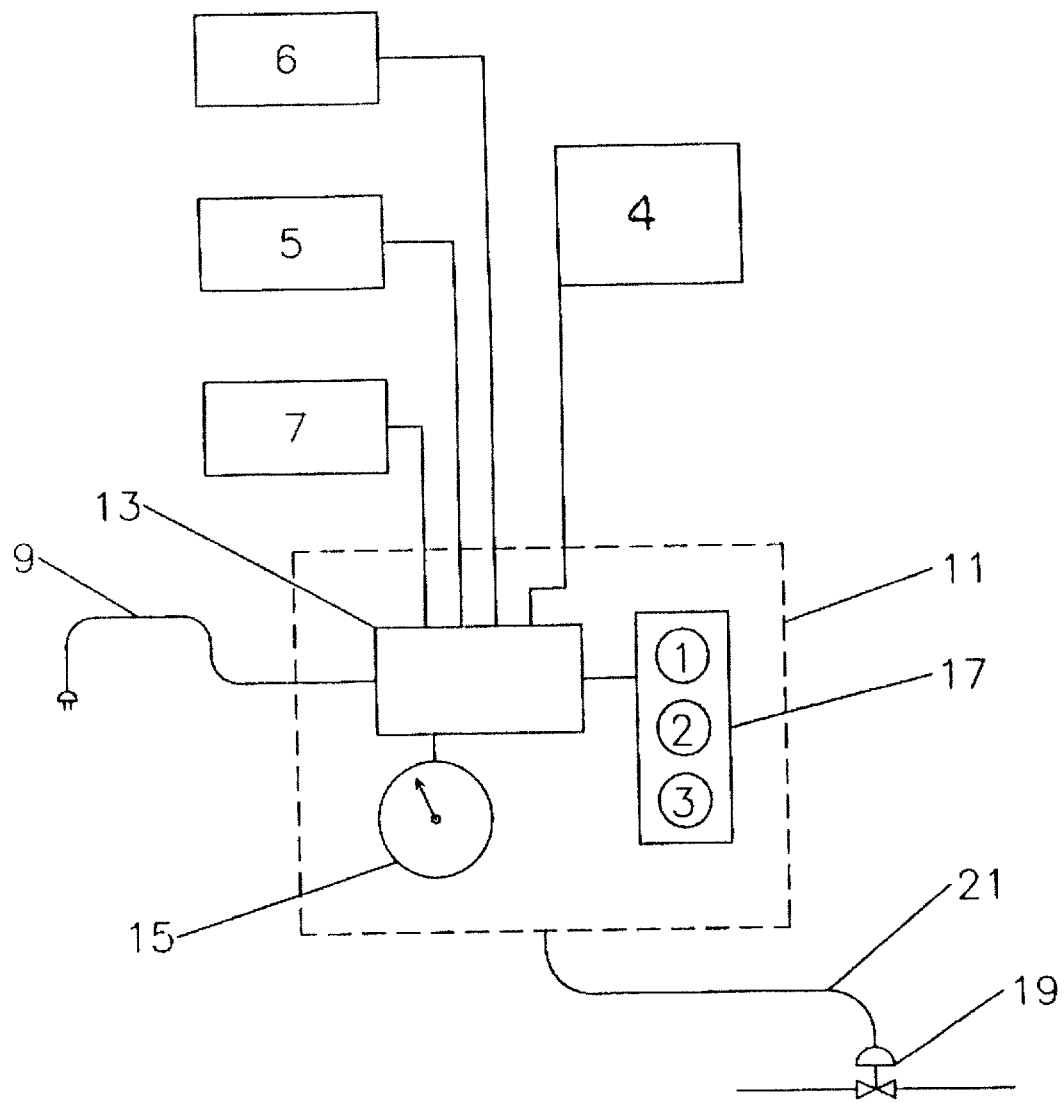
FIG. 1 Block flowsheet indicating inputs to the central processing unit and output to sprinkler control.

In FIG. 1 the essential elements of the invention are shown in block flowsheet form. A central processor or microprocessor unit 13 powered from inlet electrical line 9 is shown in the interior of body 11. The expected monthly evapotranspiration rate or EVT is available from Texas A&M University and others and is factory loaded in the microprocessor control unit 17. The EVT Data which is available by Zip code may be loaded for the expected use area and the first three numbers of a Zip code may be factory chosen and changed with controller 17 by adjusting dials with dial 1 set to the first digit, dial 2 set to the second digit and dial 3 set to the third digit to match a particular zip code. Exterior adjustment unit 15 is manually set by the user to incrementally increase or decrease the EVT data so that output from the CPU 13 varies from plus thirty five percent to minus thirty five percent. This adjustment is sufficient to allow a user to adjust from minimum growth to lush growth and to correct for variations in soil or turf for his specific area. Line 21 carries the signal from CPU to the sprinkler control valve 19.

Figure 2:
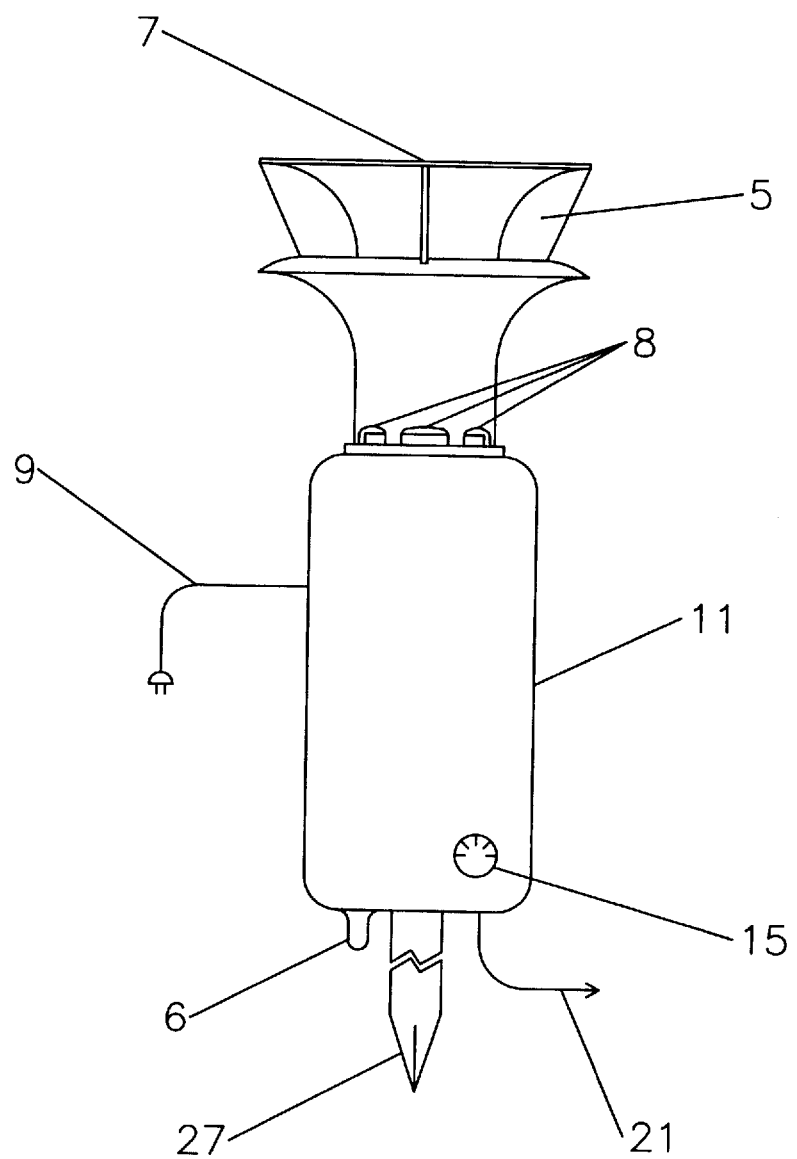
FIG. 2 indicating front view of the unit.

Temperature sensor 6 communicates with the CPU 13 to prevent watering in freezing weather and wind sensor 5 communicates with CPU 13 to prevent watering or irrigating with wind over ten miles per hour. An open cup water measuring means or sensor 7 also communicates with CPU 13 as explained more fully under discussion of FIG. 2. FIG. 2 shows the body of the unit 11 with electrical inlet 9, mounting stake 27, wind sensor 5, temperature sensor 6, water measuring means 7, user EVT data adjustment 15 and outlet signal in line 21. The signals from the water measuring unit or sensor 7, the wind sensor 5, and the temperature sensor 6 feed the CPU 13 within the body of the unit 11. In a preferred embodiment the wind sensor 5 operates by directing the air downward over a heated solid state sensor (not shown) that senses cooling by air flow as air exits ports 8. Water sensor means 7 measures water that falls into a straight sided open cup (not shown) in the interior of the unit in one eighth inch increments and sends the daily data up to a maximum indication of one fourth inch per day to be used in calculations by the central processor 13. Further when during a rain one half of an inch enters the open cup the sprinkler operation is interrupted for that day. Experience with a prototype has shown that more than one fourth inch of water held in the unit evaporates in one day. The unit is structured in this fashion because after one fourth of an inch of water has been recorded, the CPU waits till the next day to do more calculations, and the water cup will have evaporated empty. The CPU delays the sprinkler operation for a period of time when the cumulative total of added water exceeds the cumulative daily total of the EVT. Adjustment unit 15 allows the user to set the EVT so that the cumulative total of water added may be varied plus or minus thirty five percent. Operation of the central processor or microprocessor control unit 13, FIG. 1 may best be illustrated with an example. Looking at the table for EVT for Texas we see that for the month of April in Austin the expected EVT that is factory loaded in CPU 13, FIG. 1 is 5.27 inches or 0.176 inches per day. Using the table below,

| Day | Cummulative expected | Daily Measured | Cummulative total | Net | Valve |
|---|---|---|---|---|---|
| 1 | 0.176 | 0.25 rain | 0.25 | +.074 | OFF |
| 2 | 0.352 | 0.25 rain | 0.5 | +.148 | OFF |
| 3 | 0.528 | 0 | 0.5 | −.028 | ON |
| 4 | 0.704 | .25 irrigation | 0.75 | +.046 | OFF |
| 5 | 0.88 | 0 | 0.75 | −.130 | ON |

Assume one fourth of an inch of water falls in the water sensor 7 from rain and the second day another one fourth of an inch falls from rain. The CPU calculates that the total water that should have been put on the lawn was 0.352 inches of water. The cumulative water measured is 0.5 inches from rain, so the CPU delays irrigation for one day.

On the third day the cumulative expected water is 0.528 inches of water. Since the total water put on the lawn is 0.5 inches there is a water deficit so the CPU allows the irrigation cycle to run. On the fourth day 0.704 inches of water is expected however 0.75 inches of water has been put on the lawn from rain and irrigation. The CPU delays the irrigation cycle for one day. If more then 0.5 inches is put on the lawn either from rain or a combination of rain and irrigation the CPU interrupts the irrigation cycle for one day. When the wind sensor 5 indicates a wind velocity of ten miles per hour or greater for fifteen minutes the CPU 13 interrupts watering until the wind velocity drops below the ten miles per hour. When the temperature sensor drops below thirty six degrees Fahrenheit the CPU 13, FIG. 1 interrupts watering until the temperature rises above thirty six degrees.

What is claimed is:

1. An auxiliary sprinkler control system to use minimal water for healthy turf comprising;
   a) a stake mounted body,
   b) electronic circuitry and microprocessor control means inside said body;
   c) a wind sensor, an open cup water measuring means, and a temperature sensor integral to said body, said wind sensor, said water measuring means, and said temperature sensor communicating with said electronic circuitry and microprocessor control means,
   d) data for multiple areas of a country indicating expected evapotranspiration rates for each of said areas by zip code loaded in said microprocessor control means in said electronic circuitry;
   e) an adjustable input means in said body communicating with said microprocessor control means to allow choice of area of said country by zip code;
   f) a program in said electronic circuitry and said microprocessor control means that acts to:
      select monthly data for the evapotranspiration rate for a specific zip code area;
      calculate a daily rate of said evapotranspiration rate from said monthly data;
      record daily said water measurement data to one eighth of an inch and take into account a maximum of one fourth inch of water per day in calculations to determine when cumulative total added water is greater than cumulative total water needed as indicated by said EVT data said microprocessor delays said sprinkler for one day;
   g) a user adjustable means mounted in said body and communicating with said electronic circuitry and said microprocessor control unit that acts to vary said evapotranspiration data from a minimum of thirty five percent below to a maximum of thirty five percent above factory loaded evapotranspiration data.

2. An auxiliary sprinkler control system to use minimal water for healthy turf comprising;
   a) a stake mounted body,
   b) electronic circuitry and microprocessor control means inside said body;
   c) a wind sensor, an open cup water measuring means, and a temperature sensor integral to said body, said wind sensor, said water measuring means, and said temperature sensor communicating with said electronic circuitry and microprocessor control means,
   d) data for multiple areas of a country indicating expected evapotranspiration rates for each of said areas by zip code loaded in said microprocessor control means in said electronic circuitry;
   e) a choice of said data for a specific one of said areas by entering three digits of a zip code;
   f) a user adjustable means mounted in said body to modify said data by about thirty five percent;
   g) a program in said electronic circuitry and said microprocessor control means that acts to:
      select data for said evapotranspiration rate for said specific zip code area;
      calculate a daily expected rate of water addition to match said modified data for said evapotranspiration rate,
      record daily data from said water measuring means up to a maximum of approximately one fourth of an inch;
      delay said sprinkler system for one day when a cumulative total of said water added is greater than a running total of said daily evapotranspiration rate for said month.

3. An auxiliary sprinkler control system as in claim 2 wherein said electronic circuitry and said microprocessor control unit act to interrupt said water addition when said temperature measuring unit indicates a temperature below thirty six degrees Fahrenheit.

4. An auxiliary sprinkler control system as in claim 2 wherein said electronic circuitry and said microprocessor control unit act to interrupt said water addition when said wind measuring unit indicates a wind of greater than ten miles per hour for a fifteen minute period.

5. An auxiliary sprinkler control system as in claim 2 wherein said electronic circuitry and said microprocessor control unit act to interrupt said water addition when said water sensor measuring unit indicates a one half inch of water has been measured.

6. An auxiliary sprinkler control system comprising:
   a) a body means
   b) a central processor unit and associated electronic circuitry in said body;
   c) an external water measuring means communicating with said central processor;
   d) evapotranspiration rate data for turf for each month of a year for specific zip code areas loaded in said central processor;
   e) a program means in said central processor to interrupt a sprinkler for one day when a daily running total of water added with a maximum of one fourth of an inch per day taken into account exceeds a daily running total of said evapotranspiration rate data with daily rainfall taken into account as a maximum of one fourth of an inch per day; and
   f) a user adjustable means in said body to allow a user to adjust said expected evapotranspiration rate to allow said auxiliary system to allow addition of sufficient of said water to produce a lush turf growth.

* * * * *